US009164723B2

(12) United States Patent
Geiger et al.

(10) Patent No.: US 9,164,723 B2
(45) Date of Patent: Oct. 20, 2015

(54) VIRTUAL LENS-RENDERING FOR AUGMENTED REALITY LENS

(75) Inventors: Stefan C. Geiger, Illnau-Effretikon (CH); Wojciech Jarosz, Zurich (CH); Manuel J. Lang, Zurich (CH); Kenneth J. Mitchell, Addlestone (GB); Derek Nowrouzezahrai, Zurich (CH); Robert W. Sumner, Zurich (CH); Thomas Williams, Brighton (GB)

(73) Assignees: Disney Enterprises, Inc., Burbank, CA (US); ETH Zurich (Eidgenoessische Technische Hochschule Zurich), Zurich (CH)

(*) Notice: Subject to any disclaimer, the term of this patent is extended or adjusted under 35 U.S.C. 154(b) by 1011 days.

(21) Appl. No.: 13/173,134

(22) Filed: Jun. 30, 2011

(65) Prior Publication Data

US 2013/0002698 A1    Jan. 3, 2013

(51) Int. Cl.
| | |
|---|---|
| G09G 3/00 | (2006.01) |
| G09G 5/02 | (2006.01) |
| G06T 15/00 | (2011.01) |
| G06F 3/147 | (2006.01) |
| H04N 13/04 | (2006.01) |

(52) U.S. Cl.
CPC ............... G06F 3/147 (2013.01); G06T 15/00 (2013.01); H04N 13/0409 (2013.01); G06T 2215/16 (2013.01); G09G 3/003 (2013.01); G09G 5/02 (2013.01); G09G 2320/028 (2013.01); G09G 2320/068 (2013.01); G09G 2320/0666 (2013.01); G09G 2360/144 (2013.01)

(58) Field of Classification Search
CPC ..... G06F 3/04842; G06F 3/147; G06T 7/001; G06T 15/00; G06T 2215/16; G11B 31/006; H04L 65/60; H04N 21/41407; H04N 13/0409; G09G 3/02; G09G 3/003; G09G 2320/0666; G09G 2320/068; G09G 2360/144; G09G 2320/028
USPC ........... 345/619, 633, 581, 419, 582; 382/285
See application file for complete search history.

(56) References Cited

U.S. PATENT DOCUMENTS

| | | | |
|---|---|---|---|
| 7,564,469 B2 | 7/2009 | Cohen | |
| 7,775,437 B2 | 8/2010 | Cohen | |
| 8,218,873 B2 | 7/2012 | Boncyk | |
| 2003/0108251 A1* | 6/2003 | Kim et al. | 382/285 |
| 2010/0066750 A1* | 3/2010 | Yu et al. | 345/581 |
| 2011/0285622 A1 | 11/2011 | Marti | |
| 2011/0304611 A1* | 12/2011 | Suzuki | 345/419 |
| 2012/0206452 A1* | 8/2012 | Geisner et al. | 345/419 |
| 2014/0063055 A1* | 3/2014 | Osterhout et al. | 345/633 |

FOREIGN PATENT DOCUMENTS

| | | |
|---|---|---|
| WO | WO 9846323 | 10/1998 |
| WO | WO 2011060561 | 5/2011 |

* cited by examiner

*Primary Examiner* — Chante Harrison
(74) *Attorney, Agent, or Firm* — Patterson + Sheridan, LLP

(57) ABSTRACT

Techniques for displaying content using an augmented reality device are described. Embodiments provide a visual scene for display, the visual scene captured using one or more camera devices of the augmented reality device. Embodiments adjust physical display geometry characteristics of the visual scene to correct for optimal projection. Additionally, illumination characteristics of the visual scene are modified based on environmental illumination data to improve realism of the visual scene when it is displayed. Embodiments further adjust display characteristics of the visual scene to improve tone mapping output. The adjusted visual scene is then output for display on the augmented reality device.

22 Claims, 7 Drawing Sheets

VIRTUAL LENS-RENDERING FOR AUGMENTED REALITY LENS

BACKGROUND

1. Field of the Invention

The present invention generally relates to a human-computer interface and more specifically to techniques for rendering realistic scenes on an augmented reality device.

2. Description of the Related Art

Computer graphics technology has come a long way since video games were first developed. Relatively inexpensive 3D graphics engines now provide nearly photo-realistic interactive game play on hand-held video game, home video game and personal computer hardware platforms costing only a few hundred dollars. These video game systems typically include a hand-held controller, game controller, or, in the case of a hand-held video game platform, an integrated controller. A user or player uses the controller to send commands or other instructions to the video game system to control a video game or other simulation being played. For example, the controller may be provided with a manipulator (e.g., a joystick) and buttons operated by the user.

Many hand-held gaming devices include some form of camera device which may be used to capture an image or a series of images of a physical, real-world scene. The captured images can then be displayed, for instance, on a display of the hand-held gaming device. However, the displayed images may not accurately reflect all the visual properties of the physical scene. For instance, due to limitations in the camera device and/or the display device, color tones of displayed objects on the hand-held gaming device may not match the color tones of the respective objects in the physical scene. Furthermore, while a user may manually adjust display properties of the hand-held gaming device (e.g., contrast, brightness, etc.) so that the display is more realistic for certain environments, these same adjustments may produce an unrealistic display in other environments.

SUMMARY

Embodiments of the invention provide a method, computer-readable storage medium and system for displaying content using an augmented reality device. The method, computer-readable storage medium and augmented reality device include providing a visual scene for display. Such a visual scene is captured using one or more camera devices of the augmented reality device. Additionally, the method, computer-readable storage medium and augmented reality device include adjusting at least one of: physical display geometry characteristics of the visual scene based on a viewing pose of a user of the augmented reality device, illumination characteristics of the visual scene based on environmental illumination data, and display characteristics of the visual scene to improve tone mapping output. The method, computer-readable storage medium and augmented reality device further include outputting the adjusted visual scene for display on the augmented reality device.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
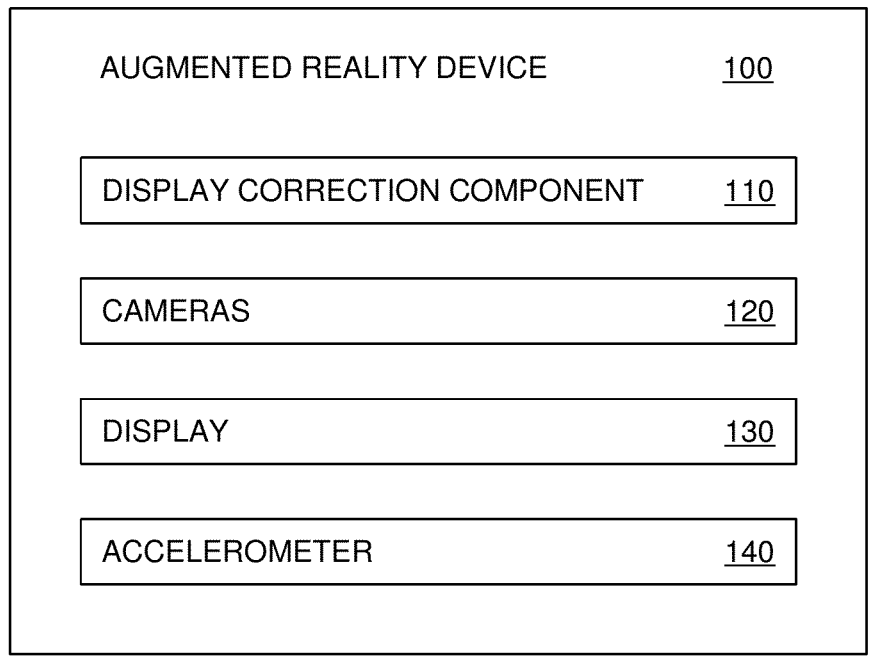
FIG. 1 is a block diagram illustrating an augmented reality device configured with a display correction component, according to one embodiment of the present invention.

Embodiments of the invention provide techniques for displaying content on an augmented reality device. Generally, as used herein, an augmented reality device refers to any device capable of displaying a real-time view of a physical, real-world environment while altering elements within the displayed view of the environment. As such, unlike a virtual reality device which displays a view of virtual world, an augmented reality device displays a view of the real world but augments elements using computer graphics technology. Such an augmented reality device may include a camera device (or multiple camera devices) used to capture a view of the real-world environment and may further include computer software and/or hardware configured to augment elements of the captured scene. For example, an augmented reality device could capture a series of images of a coffee cup sitting on top of a table, modify the series of images so that the coffee cup appears as an animated cartoon character and display the modified series of images in real-time to a user. As such, when the user looks at the augmented reality device, the user sees an augmented view of the physical real-world environment in which the user is located.

One challenge for augmented reality devices is that the images displayed on the augmented reality device do not exactly match the physical real-world environment. This may result from a variety of factors, such as limitations in the camera devices of the augmented reality device, the display device of the augmented reality device, the angle at which the user is viewing the display device, and so on. For instance, when a user looks at an image displayed on the augmented reality device, edges of objects displayed on the device may not line up properly with edges of corresponding real-world objects the user sees behind the augmented reality device. As another example, color tones of objects displayed on the augmented reality device may not exactly match the color tones the user sees when the user looks at the corresponding objects of the physical real-world environment. This results in a less realistic display for the augmented reality device, which may negatively affect the user's experience in using the augmented reality device.

Embodiments of the invention provide techniques for displaying content on an augmented reality device. Embodiments capture a visual scene of the real-world physical environment in which the augmented reality device is being used. For example, the visual scene may be a series of images of frames captured using camera devices present on the augmented reality device. Software running on the device may be configured to adjust characteristics of the visual scene to improve the appearance and realism of the visual scene when displayed. For instance, embodiments may adjust physical display geometry characteristics of the visual scene to correct for optimal projection. As an example, embodiments may determine a user's viewing angle for a display device of the augmented reality device and adjust elements of the visual scene to account for this viewing angle. Additionally, illumination characteristics of the visual scene are modified based on environmental illumination data to improve realism of the visual scene when it is displayed. As an example, embodiments may collect illumination data on light sources within the physical real-world environment as well as objects within the environment. Software running on the augmented reality device may then use this data to enhance illumination affects within the visual scene when displayed by the augmented reality device. Embodiments further adjust display characteristics of the visual scene to improve tone mapping output. For instance, embodiments may use data on the camera device and display device of the augmented reality device, as well as the collected illumination data, to adjust colors tones of objects in the visual scene to better match the color tones the user sees when looking at corresponding objects in the real world. The adjusted visual scene is then output for display on the augmented reality device. Advantageously, doing so creates a more realistic scene for display on the augmented reality device, which in turn may improve a user's experience when using the augmented reality device.

FIG. 1 is a block diagram illustrating an augmented reality device configured with a display correction component, according to one embodiment of the present invention. As shown, the augmented reality device 100 includes a display correction component 110, camera devices 120, a display device 130 and an accelerometer 140. Generally, the display correction component 110 is configured to modify characteristics of captured images of a real-world environment to improve the realism of the captured images when they are displayed (e.g., on the display device 130). The camera devices 120 may include cameras for capturing a visual scene. As used herein, a visual scene refers to a view(s) of the real-world environment in which the device 100 is being used. For instance, a visual scene may be a series of images of a real-world environment. The camera devices 120 may also include one or more user-facing cameras. The display correction component 110 could use such a user-facing camera device 120 to, e.g., determine an angle at which the user is viewing the display device 130. Generally, the accelerometer 140 is a device capable of measuring the physical (or proper) acceleration of the augmented reality device 100. The display correction component 110 may use the accelerometer 140 to, e.g., determine when the position of the augmented reality device 100 is changing, which could indicate the user's viewing angle of the display device 130 is also changing.

The display correction component 110 may be configured to modify physical display geometry characteristics of the visual scene in order to improve the realism of the visual scene when displayed. For instance, when the user views the augmented reality device from a particular viewing angle, edges of objects displayed on the augmented reality device may not properly line up with edges of corresponding real-world objects the user sees behind the augmented reality device. Accordingly, the display correction component 110 could determine the viewing angle at which the user is viewing the display 130 of the augmented reality device 100 and modify the visual scene based on the determined viewing angle. As an example, the display correction component 110 could shift objects in the visual scene in a particular direction based on the viewing angle, such that when the visual scene is displayed to the user, the edges of the objects line up with the corresponding real-world objects. Advantageously, doing so improves the appearance of the visual scene when displayed by increasing the realism of the displayed scene.

Additionally, the display correction component 110 may be configured to modify illumination characteristics of the visual scene. For instance, the display correction component 110 may access environmental illumination data describing illumination properties of the real-world physical environment. Such data may include, without limitation, positions of light sources within the environment, information on the light sources (e.g., brightness, color, angle, etc.), objects within the environment, and information on the objects (e.g., a measurement of reflectivity of the object). The display correction component 110 may then use such data to enhance the realism of the visual scene. For instance, the augmented reality device 100 may modify the visual scene by removing one of the objects from the scene. The display correction component 110 could then use the environmental illumination data to replace the removed object with pre-captured background data. For example, in a physical real-world environment where a coffee cup is sitting on top of a table, the augmented reality device 100 could remove the coffee cup from captured images of the environment. In such an example, the display correction component 110 could replace the coffee cup in the visual scene with pre-captured background data describing the appearance of the table top. Additionally, the display correction component 110 could modify elements of the visual scene to account for environment illumination sources. As such, continuing the example, the display correction component 110 could add a reflection affect to the modified area of the table top from which the coffee cup was removed, based on the environmental illumination data describing the light sources of the environment and the reflectivity of the table.

The display correction component 110 may also adjust display characteristics of the visual scene to ensure that color tones of the visual scene match the color tones of corresponding objects in the physical environment. For instance, colors on a particular display device 130 could appear differently depending on the viewing angle at which the display 130 is viewed. Accordingly, the display correction component 110 could determine a viewing pose at which the user is viewing the display 130 (e.g., using a user-facing camera 120) and adjust the color tones accordingly. That is, the display correction component 110 may adjust the color tones of the visual scene such that objects displayed on the display device 130 will appear with the same color tones as corresponding objects in the real-world environment. Advantageously, doing this improves the appearance of images displayed by the augmented reality device 100, which may in turn improve the user's experience in using the augmented reality device 100.

In one embodiment of the invention, the augmented reality device 100 may be configured with a parallax barrier for use in displaying three-dimensional ("3D") images. Generally, a parallax barrier is a layer of material in front of a display screen which effectively contains a number of slots. As such, an image may be displayed on the display screen which includes a first image for the user's left eye and a second image for the user's right eye, and when the display is viewed by a user at a certain angle, the user's left eye will see only the first image through certain slots in the parallax barrier and the user's right eye will see only the second image through other slots in the parallax barrier. As an example, when a user views such a parallax barrier, each eye may effectively see every other pixel of the display. Such techniques may then be used for displaying 3D images to the user.

However, for the parallax barrier to function as intended, the user must view the display from a certain angle in order for the slits in the parallax barrier to align correctly. In contrast, an active parallax barrier is a barrier where the angle and/or the displacement of the slots in the barrier may be modified dynamically. As such, where the augmented reality device 100 is configured with an active parallax barrier, the display correction component 110 may be configured to determine a viewing angle of the user (e.g., using a user-facing camera 120 and/or the accelerometer 140) and to adjust the slots in the active parallax barrier based on the user's viewing angle. Doing so enables the user to see a 3D image on the display of the augmented reality device 100 from a number of different angles.

Figure 2:
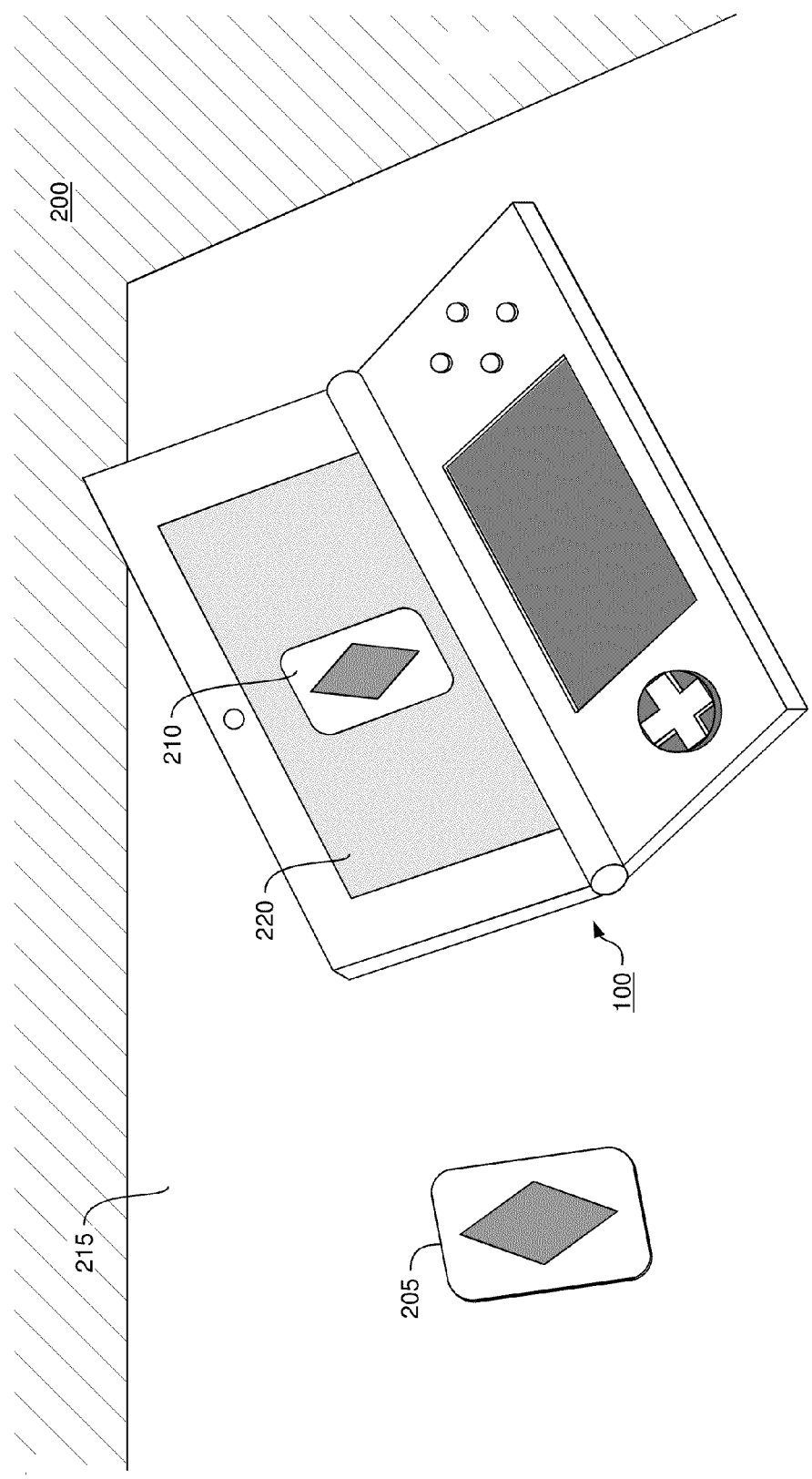
FIG. 2 is a diagram illustrating an augmented reality device, according to one embodiment of the present invention.

FIG. 2 is a diagram illustrating an augmented reality device, according to one embodiment of the present invention. As shown, the scene 200 includes an augmented reality device 100 facing a table 215 with a card 205 sitting atop it. Here, the augmented reality device 100 includes a display screen 220, which shows a captured image 210 of the card 205 and table surface 215. According to embodiments of the invention, the augmented reality device 100 may be configured to run a display correction component 110. Such a display correction component 110 may be configured to perform one or more adjustment operations on captured images of the physical environment in order to improve the appearance of images displayed on the display screen 220 of the augmented reality device 100. For example, for a captured image of the card 205 resting upon the table 215, the display correction component 110 could alter a color tone of the card in the captured image, such that the color tone of the displayed card 210 matches the color tone the user sees when viewing the physical card 205 in the real-world physical environment. Advantageously, by displaying more realistic images on the display screen 220 of the augmented reality device 100, embodiments of the invention improve the experience of users of the augmented reality device 100.

Figure 3:
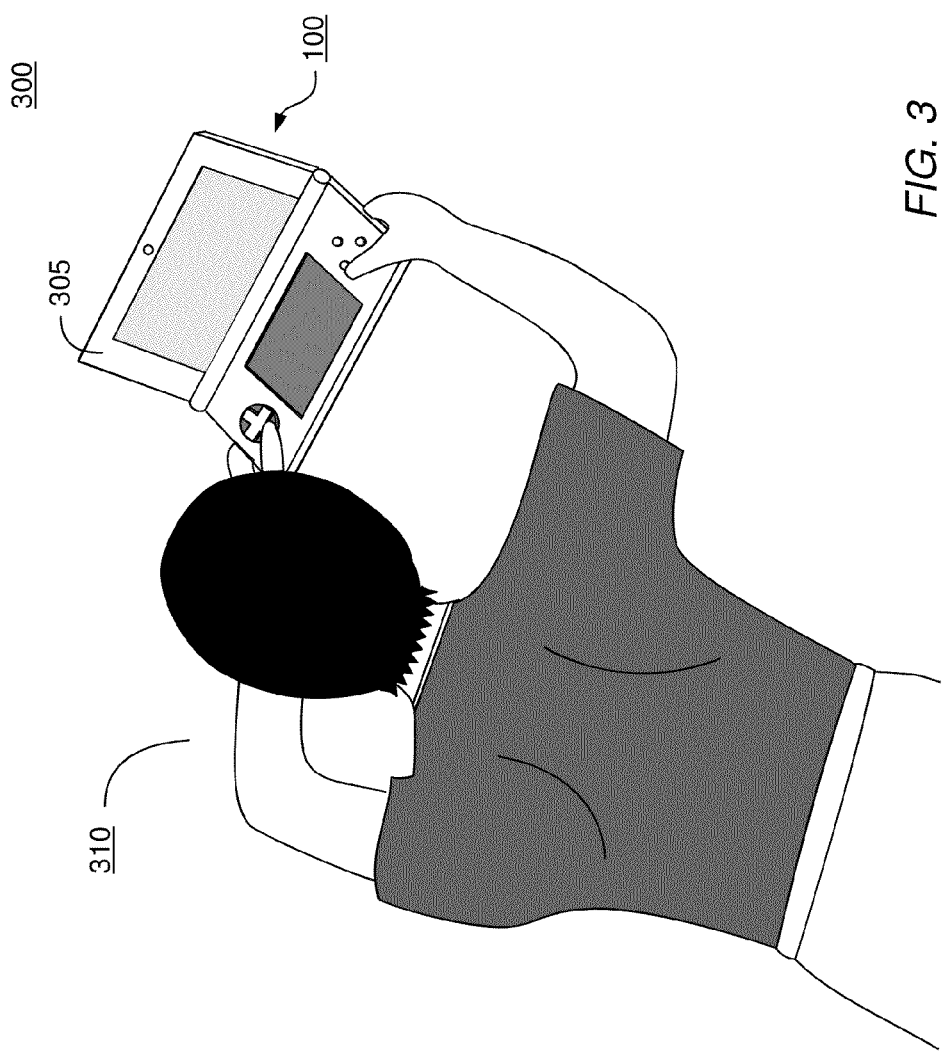
FIG. 3 is a diagram illustrating an augmented reality device, according to one embodiment of the present invention.

FIG. 3 is a diagram illustrating an augmented reality device, according to one embodiment of the present invention. As shown, the scene 300 includes a user 310 holding an augmented reality device 100 equipped with a user-facing camera device 305. As discussed above, a display correction component 110 on the augmented reality device 100 may use the user-facing camera device 305 to identify a viewing angle at which the user 310 is viewing the display of the augmented reality device 100. The display correction component 110 may then use the viewing angle to improve the appearance of images displayed on the augmented reality device 100. For example, the display correction component 110 may determine that, due to properties of the display of the augmented reality device, color tones in the image displayed on the device should be altered in order to match the color tones of corresponding real-world objects when the user views the display from certain angles. As another example, the display correction component 110 could determine that, based on the viewing angle at which the user 310 is viewing the augmented reality device 100, the edges of certain objects in the displayed image should be shifted, so that edges of objects displayed on the augmented reality device 100 line up with the edges of corresponding real-world objects. As yet another example, in an embodiment where the augmented reality device is configured with an active parallax barrier, the display correction component 110 may alter one or more slots in the active parallax barrier based on the viewing angle at which the user 310 is viewing the augmented reality device 100, so as to ensure the user 310 sees a 3D image when viewing the augmented reality device 100. Advantageously, doing this improves the appearance of images displayed by the augmented reality device 100 by adjusting the images to be more realistic based on the viewing angle of the user.

Figure 4:
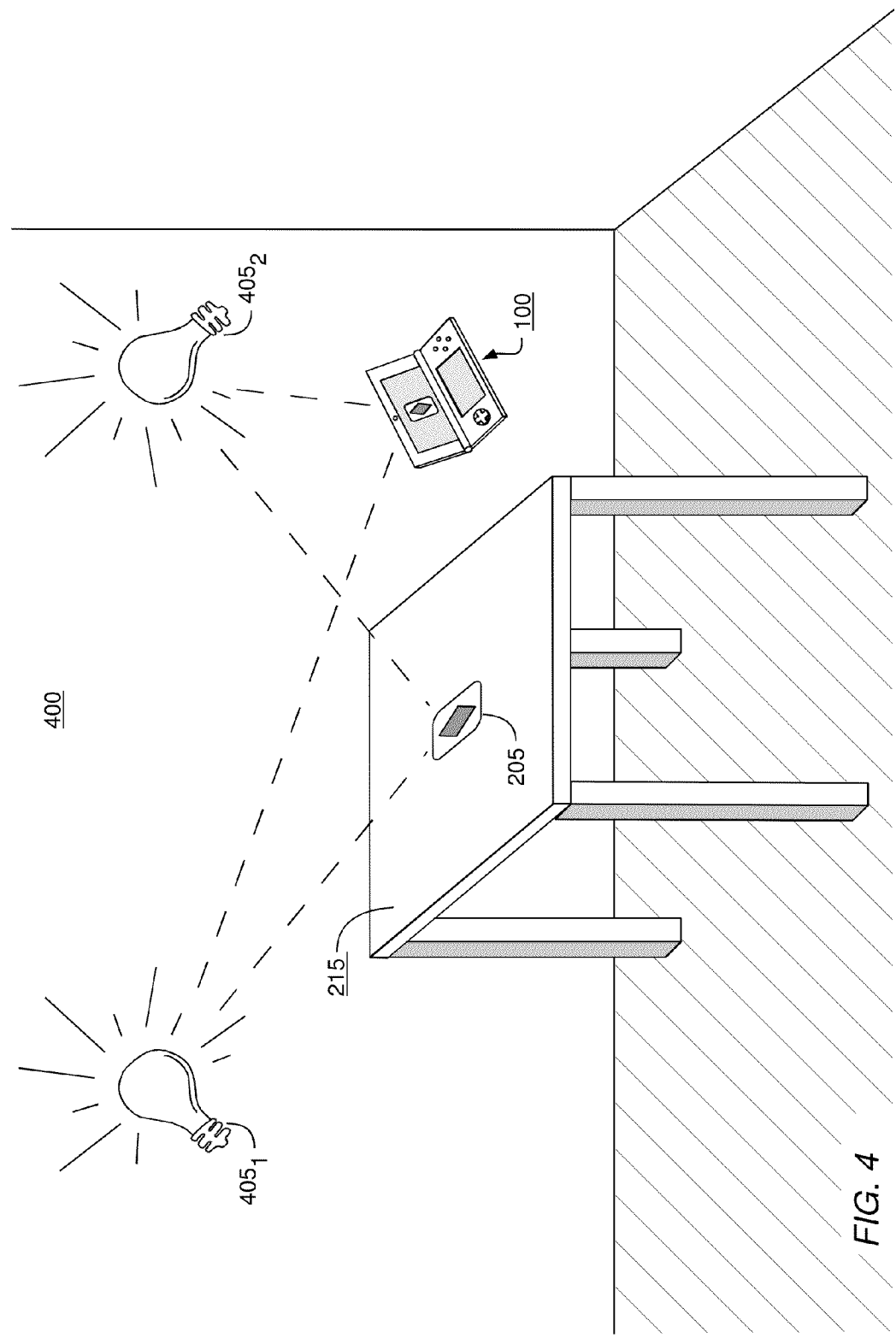
FIG. 4 is a diagram illustrating a scene including an augmented reality device, according to one embodiment of the present invention.

FIG. 4 is a diagram illustrating a scene including an augmented reality device, according to one embodiment of the present invention. As shown, the scene 400 includes an augmented reality device 100, a table 215 with a card 205 sitting atop it, and light sources 405. Generally, the light sources 405 represent any entity within the environment 400 capable of emitting light. Examples of such light sources include, without limitation, point light sources (e.g., a light bulb) and area light sources (e.g., a window). As discussed above, in one embodiment, the display correction component 110 is configured to collect environmental illumination data describing the environment in which the device 100 is located. For instance, such environmental illumination data could include a position of each of the light sources 405, an angle of each of the light sources 405 (or if the light sources 405 are omnidirectional), a color of light produced by each of the light sources 405 and so on. In one embodiment, the display correction component 110 is configured to identify the light sources 405 within the environment by applying a convolution filter to images captured within the environment in order to detect areas of high-frequency illumination.

The display correction component 110 may use this information, in conjunction with data from the accelerometer 140 describing the movement of the augmented reality device 100 while the images were taken, to identify the location and other information about the light sources 405. Such light sources location information may be relative to, for instance, the position of the augmented reality device 100 within the environment 400. In particular embodiments, the display correction component 110 may use other devices to determine the relative position of the augmented reality device 100 within the environment 400. Examples of such other devices include, without limitation, compasses, global positioning system ("GPS") devices, and mobile skyhook location sensing technologies. More generally, however, any technique or device capable of determining or assisting in determining the relative position of the augmented reality device 100 may be used in accordance with embodiments of the present invention.

Additionally, the display correction component 110 may collect data on objects within the environment. As an example, the display correction component 110 could analyze images taken with the environment to identify the table object 215 and the card object 205 sitting atop the table 215. The display correction component 110 may also determine properties of the identified objects, such as a measurement of reflectivity for each of the objects. Such data may then be used in displaying realistic content on the augmented reality device. As an example, assume the augmented reality device 100 captures an image showing both the table 215 and the card 205 and augments the image to remove the card 205 completely. In such an example, the display correction component 110 may use the environmental illumination data to adjust characteristics of the augmented image in order to improve the appearance of the image. For instance, the display correction component 110 could use pre-captured background data from previous images in order to fill in the area of the table 215 which was covered up by the now-removed card 205. Continuing the example, the display correction component 110 could then apply illumination effects to the filled-in area of the table 215, based on environmental illumination data describing the light sources 405 within the environment. Advantageously, doing so creates a more realistic image for display on the augmented reality device.

Figure 5:
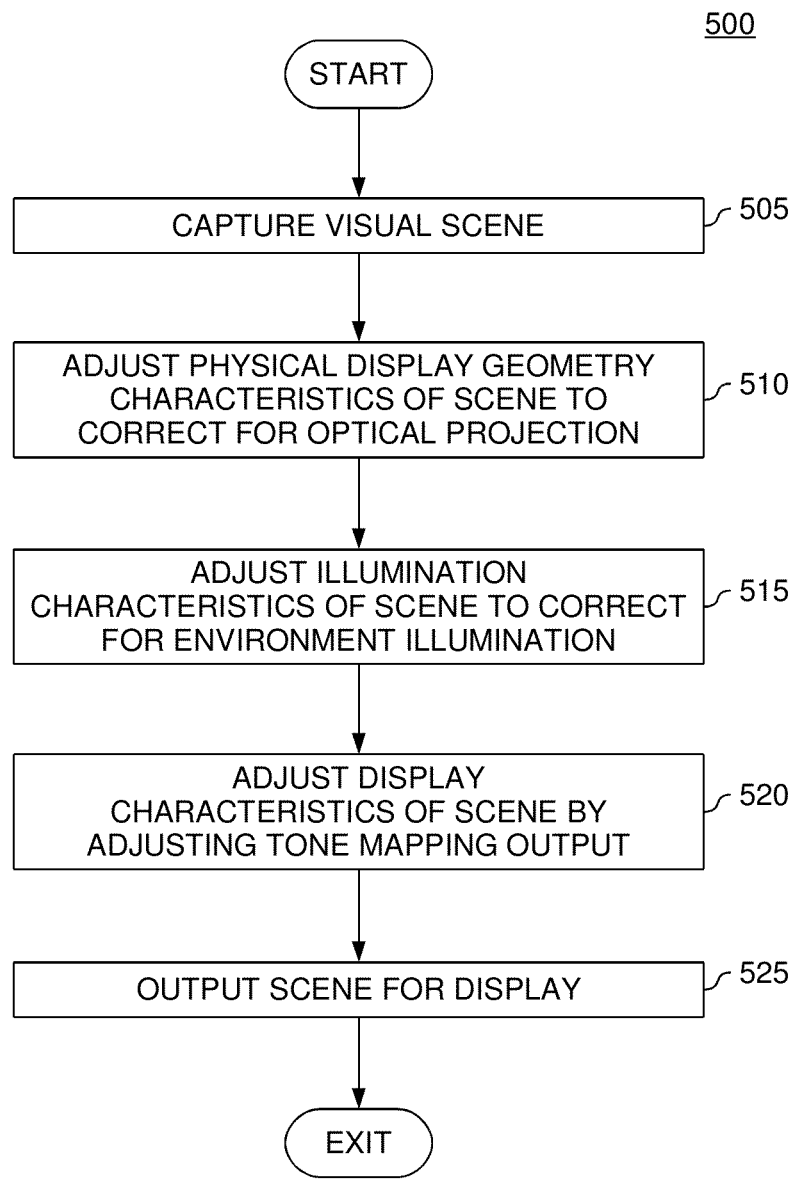
FIG. 5 is a flow diagram illustrating a method for displaying content on an augmented reality device, according to one embodiment of the present invention.

FIG. 5 is a flow diagram illustrating a method for displaying content on an augmented reality device, according to one embodiment of the present invention. As shown, the method 500 begins at step 505, where an augmented reality device 100 captures a visual scene. Generally, the augmented reality device 100 captures the visual scene using one or more camera devices 120. Furthermore, as discussed above, the visual scene typically consists of a series of images of a physical environment.

Once the visual scene is captured, the display correction component 110 adjusts physical display geometry characteristics of the visual scene (step 510). Such an adjustment is made, e.g., to improve the optical projection of the display 130 of the augmented reality device 100 based on a viewing angle of the user of the device 100. For instance, the display correction component 110 may determine the user's viewing angle to the augmented reality device 100 using one or more user-facing cameras 120 on the device 100. The display correction component 110 may further maintain data on the display 130 of the augmented reality device 100 that describes properties of the display 130 from various viewing angles. For instance, a particular display 130 could appear to have reduced brightness and duller color tones when viewed from a certain viewing angle. Accordingly, upon determining that the user is viewing the display 130 from the certain viewing angle, the display correction component 110 could boost the brightness and enhance the color tones of the visual scene so as to create a more realistic display of the visual scene.

Additionally, at step 515, the display correction component 110 adjusts illumination characteristics of the visual scene based on environmental illumination. That is, the display correction component 110 may maintain data describing illumination properties of the environment in which the augmented reality device 100 is located. The display correction component 110 may alter the visual scene in such a way that the visual scene has more realistic illumination effects when displayed. For instance, the environmental illumination data may specify information on light sources within the environment, such as the location of the light source, the brightness of the light source, the color of light produced by the light source, an angle of the light source (or if the light source is omnidirectional) and so on. Additionally, the environmental illumination data may specify illumination properties of objects within the environment. For instance, the environmental illumination data could specify a reflectivity of various surfaces within the environment. Using this environmental illumination data, the display correction component 110 modifies the visual scene to improve the realism of lighting effects within the visual scene when displayed.

The display correction component 110 may also adjust display characteristics of the visual scene to ensure proper tone mapping output (step 520). As discussed above, the display correction component 110 may maintain data on the display device 130 of the augmented reality device 100. Additionally, the display correction component 110 may also maintain data on the camera devices 120 of the augmented reality device 100. For instance, such data could indicate that a camera 120 of the augmented reality device 100 captures green color tones in a way that makes them appear as duller than they really are when they are displayed on the display device 130. As such, the display correction component 110 could adjust the display characteristics of the visual scene to sharpen the green color tones of the captured visual scene so that the color tones of the captured visual scene when displayed will match those of the physical environment, thus improving the realism of the displayed visual scene.

At step 525, the display correction component 110 outputs the adjusted visual scene for display. For instance, the adjusted visual scene could be displayed using the display device 130 of the augmented reality device 100. By adjusting the physical display geometry characteristics, illumination and display characteristics of the captured scene, improves the realism of the scene when it is displayed to the user. This, in turn, may improve the user's experience with the augmented reality device.

Figure 6:
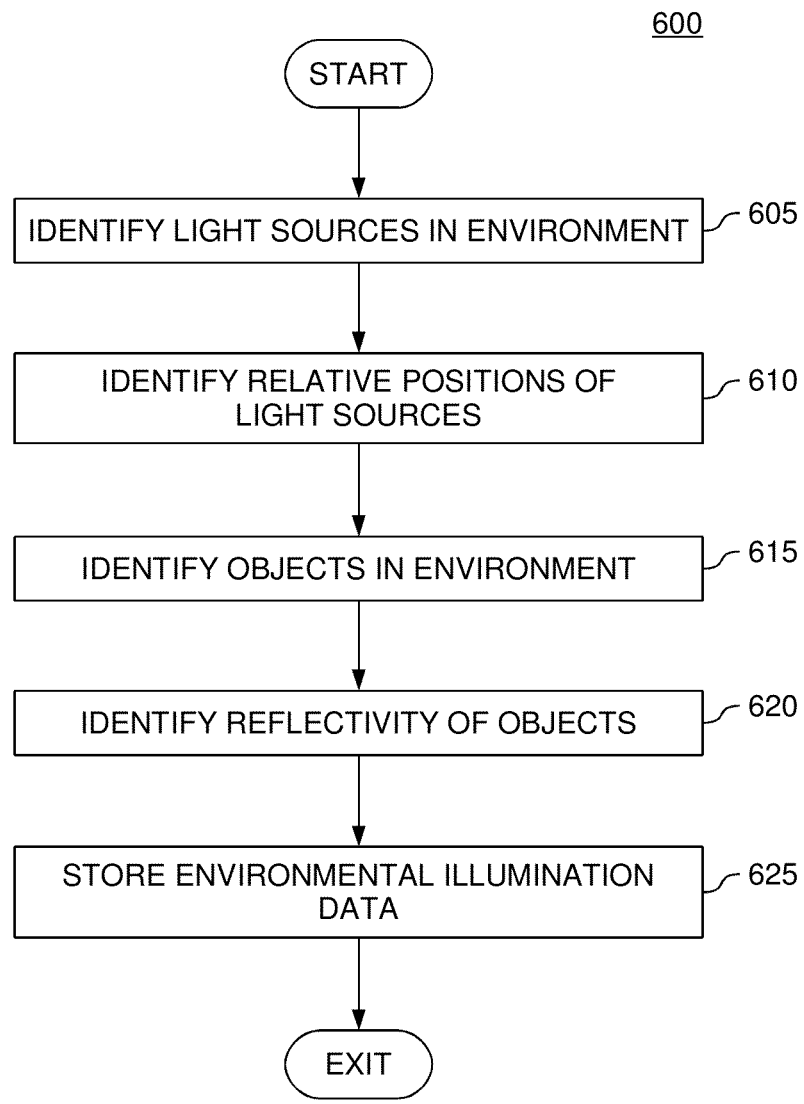
FIG. 6 is a flow diagram illustrating a method for collecting environmental data, according to one embodiment of the present invention.

FIG. 6 is a flow diagram illustrating a method for collecting environmental data, according to one embodiment of the present invention. As shown, the method 600 begins at step 605, where the display correction component 110 identifies light sources within an environment in which the augmented reality device 100 is located. As discussed above, the display correction component 110 may identify light sources by applying a convolution filter to a series of images of the environment (e.g., images taken using a camera 120 on the augmented reality device 100) to detect areas of high-frequency illumination.

Additionally, the display correction component 110 identifies relative positions of the light sources within the environment (step 610). For instance, the display correction component 110 could identify the positions of the light sources from the series of images of the environment. The display correction component 110 could also use the accelerometer 140 of the augmented reality device 100 in identifying the positions of the light sources. For instance, the display correction component 110 could use the accelerometer 140 to track the position of the augmented reality device 100 within the environment and use this positional information in conjunction with the series of images of the environment to identify the relative positions of light sources within the environment.

The display correction component 110 may also identify objects within the physical environment (step 615). For instance, the display correction component 110 could analyze the series of images of the environment in order to identify various objects contained within the environment. For example, in the environment shown in FIG. 4, the display correction component 110 could identify the table object 215 as well as the card object 205. Additionally, in one embodiment, the display correction component 110 may be configured to analyze the series of images in order to derive background data charactering the background objects within a scene (i.e., objects that remain relatively fixed or static relative to objects that move around). Such data may be referred to herein as "pre-captured background data." Thus, the background generally provides a "stage" for foreground objects (people, vehicles, animals, etc.) For instance, the display correction component 110 could store data on the appearance of the table top of the table object 215. The display correction component 110 could use the background data to adjust properties of the visual scene. For example, upon removing an object from the visual scene, the display correction component 110 could use the background data to populate the portion of scene where the removed object was previously located. Doing so creates an augmented visual scene that is more realistic to the user.

Once the objects are identified, the display correction component 110 determines a reflectivity for each of the objects (step 620). For instance, the display correction component 110 could analyze the series of images of the environment together with the determined information about the light sources within the environment and their relative positions to determine how reflective the objects within the environment are. Once the reflectivity information is determined, the display correction component 110 stores the information regarding the light sources and objects within the environment as environmental illumination data (step 625), and the method 600 ends.

As discussed above, the environmental illumination data may then be used to enhance subsequently captured visual scenes. For instance, in an embodiment where the augmented reality device 100 is configured to remove one or more objects from the captured visual scene, the display correction component 110 may use the background data from the environmental illumination data to replace the removed item with a realistic image. As an example, when the augmented reality device 100 performs an operation to remove the card object 205 from the table 215 in a particular image, the display correction component 110 could use pre-captured background data for the surface of the table to fill in the area of the visual scene where the card object was previously located. In one embodiment, the display correction component 110 may be configured to use in-painting techniques to fill in the area of the scene where the card object was previously located. That is, the display correction component 110 could analyze portions of the table 215 surrounding the removed section, e.g., to determine the color tones, pattern and texture of the surrounding area. The display correction component 110 could then fill in the removed area based on determined properties of the surrounding area.

Additionally, in such an example, the display correction component 110 may use data regarding the light sources within the environment as well as the data describing the reflectivity of the table surface to create realistic lighting effects for the filled-in area of the visual scene. Advantageously, doing so enables the augmented reality device to display a realistic image of the captured visual scene, which in turn improves the user's experience of using the augmented reality device.

Figure 7:
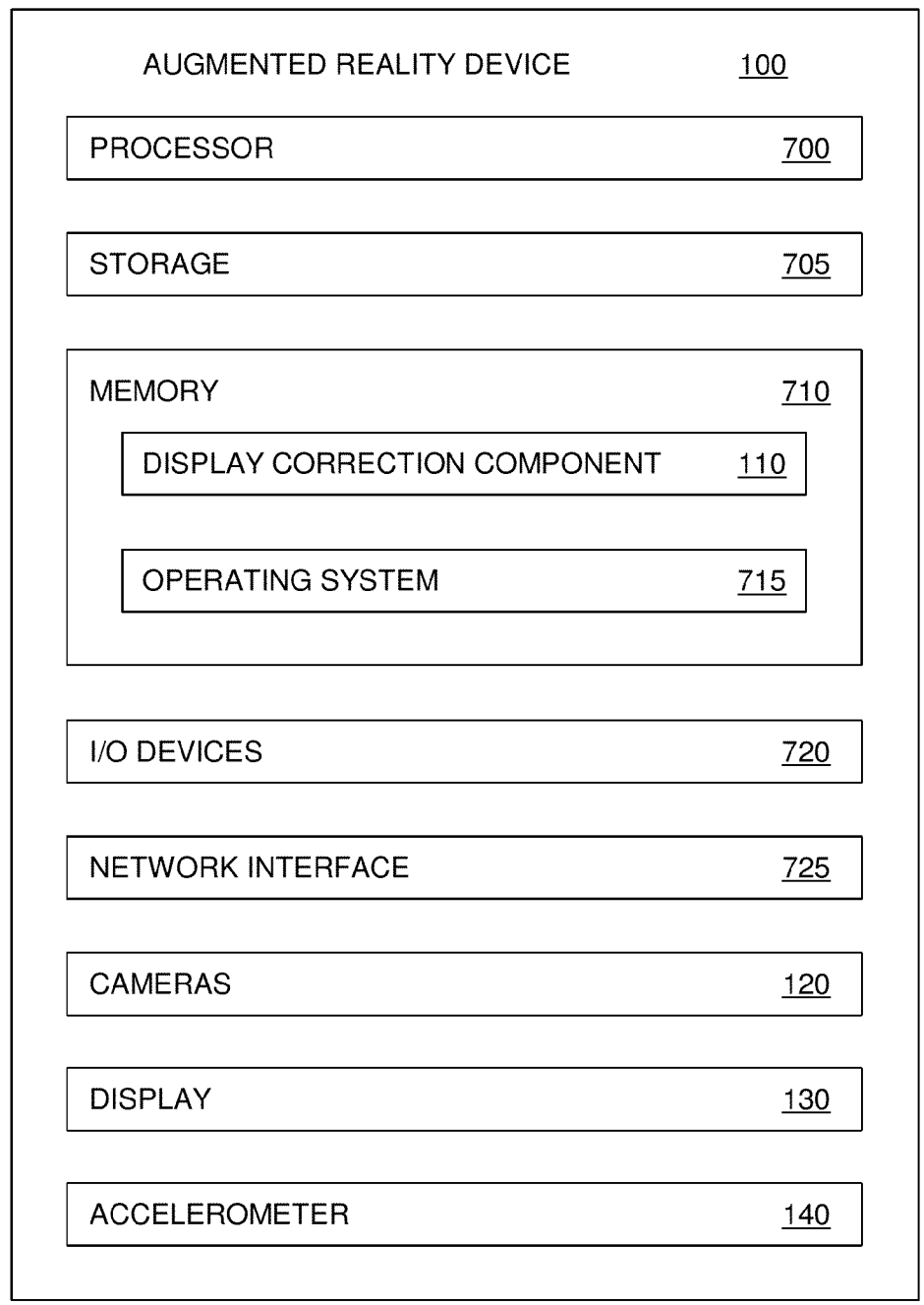
FIG. 7 is a block diagram illustrating an augmented reality device configured with a display correction component, according to one embodiment of the present invention.

FIG. 7 is a block diagram illustrating an augmented reality device configured with a display correction component, according to one embodiment of the present invention. In this example, the augmented reality device 100 includes, without limitation, a processor 700, storage 705, memory 710, I/O devices 720, a network interface 725, camera devices 120, a display devices 130 and an accelerometer device 140. Generally, the processor 700 retrieves and executes programming instructions stored in the memory 710. Processor 700 is included to be representative of a single CPU, multiple CPUs, a single CPU having multiple processing cores, GPUs having multiple execution paths, and the like. The memory 710 is generally included to be representative of a random access memory. The network interface 725 enables the augmented reality device 100 to connect to a data communications network (e.g., wired Ethernet connection or an 802.11 wireless network). Further, while the depicted embodiment illustrates the components of a particular augmented reality device 100, one of ordinary skill in the art will recognize that augmented reality devices may use a variety of different hardware architectures. Moreover, it is explicitly contemplated that embodiments of the invention may be implemented using any device or computer system capable of performing the functions described herein.

The memory 710 represents any memory sufficiently large to hold the necessary programs and data structures. Memory 710 could be one or a combination of memory devices, including Random Access Memory, nonvolatile or backup memory (e.g., programmable or Flash memories, read-only memories, etc.). In addition, memory 710 and storage 705 may be considered to include memory physically located elsewhere; for example, on another computer communicatively coupled to the augmented reality device 100. Illustratively, the memory 710 includes a display correction component 110 and an operating system 715. The operating system 715 generally controls the execution of application programs on the augmented reality device 100. Examples of operating system 715 include UNIX, a version of the Microsoft Windows® operating system, and distributions of the Linux® operating system. (Note: Linux is a trademark of Linus Torvalds in the United States and other countries.) Additional examples of operating system 715 include custom operating systems for gaming consoles, including the custom operating systems for systems such as the Nintendo DS® and Sony PSP®.

The I/O devices 720 represent a wide variety of input and output devices, including displays, keyboards, touch screens, and so on. For instance, the I/O devices 720 may include a display device used to provide a user interface. As an example, the display may provide a touch sensitive surface allowing the user to select different applications and options within an application (e.g., to select an instance of digital media content to view). Additionally, the I/O devices 720 may include a set of buttons, switches or other physical device mechanisms for controlling the augmented reality device 100. For example, the I/O devices 720 could include a set of directional buttons used to control aspects of a video game played using the augmented reality device 100.

The display correction component 110 may generally adjust characteristics of images displayed on the display device 130 to improve the appearance of the displayed images. That is, the display correction component 110 may adjust the displayed images so that the images more closely resemble a corresponding physical real-world scene. Such adjustment may include adjusting physical display geometry characteristics of a visual scene to correct for optimal projection based on a viewing angle at which a user is viewing the augmented reality device 100. Additionally, the display correction component 110 may adjust illumination characteristics of the visual scene using environmental illumination data collected for the environment in which the augmented reality device 100 is located. Furthermore, the display correction component 110 may adjust display characteristics of the visual scene to improve color tone mapping between objects displayed on the display device 130 and corresponding real-world objects. Advantageously, by adjusting characteristics of the images displayed on the display device 130 of the augmented reality device 100, embodiments create a more realistic image for display by the augmented reality device 100 and accordingly improve the user's experience when using the augmented reality device 100.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access environmental illumination data available in the cloud. For example, a display correction component 110 could execute on an augmented reality device 100 operated by a user and collect environment illumination data pertaining to the user's current environment. In such a case, the display correction component 110 could transmit the collected data to a computing system in the cloud for storage. When the user again returns to same environment, the display correction component 110 could query the computer system in the cloud to retrieve the environmental illumination data and could then modify illumination characteristics of the scene displayed on the augmented reality device 100 based on the retrieved data. Doing so allows a user to access this information from any device or computer system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for displaying content using an augmented reality device, comprising:
   providing a visual scene for display, wherein the visual scene is captured from a physical environment using one or more camera devices of the augmented reality device;
   modifying the visual scene, comprising:
      removing one or more physical content elements from the visual scene;
      replacing the removed one or more physical content elements, in the visual scene, using at least one image of the physical environment previously captured using the one or more camera devices; and
      adjusting one or more of:
         physical display geometry characteristics of the visual scene based on a viewing pose of a user of the augmented reality device;
         illumination characteristics of the visual scene based on environmental illumination data; and
         display characteristics of the visual scene to improve tone mapping output;
   and
   outputting the adjusted visual scene for display on the augmented reality device.

2. The method of claim 1, further comprising:
   measuring one or more environmental illumination characteristics of an environment in which the augmented reality device is located; and
   generating the environmental illumination data based on the one or more environmental illumination characteristics.

3. The method of claim 2, wherein determining one or more environmental illumination characteristics of the environment further comprises:
   applying a convolution filter to a series of captured images of the environment to determine a measurement of illumination for one or more areas of the captured images;
   determining relative movements of the augmented reality device; and
   determining one or more light sources within the environment, based on the identified areas of high-frequency illumination and the determined movement activity of the augmented reality device.

4. The method of claim 1, further comprising:
   determining movement activity of the augmented reality device using an accelerometer of the augmented reality device,
   wherein the physical display geometry characteristics of the visual scene are adjusted further based on the determined movement activity.

5. The method of claim 1, wherein the environmental illumination data specifies at least one of a position of a light source within an environment in which the augmented reality device is located, an angle of the light source, an indication of whether the light source is omnidirectional, a color of the light source, an intensity of the light source and a reflectivity value the at least one content element in the environment.

6. The method of claim 1, wherein adjusting the one or more physical display geometry characteristics of the visual scene further comprises:
   adjusting one or more active parallax barrier characteristics of the visual scene, based on the viewing pose of the user of the augmented reality device.

7. The method of claim 1, wherein the viewing pose of the user of the augmented reality device is determined using one or more user-facing cameras of the augmented reality device.

8. The method of claim 1, wherein the at least one image of the physical environment previously captured using the one or more camera devices corresponds to a portion of the physical environment obscured in the visual scene by the removed one or more physical content elements.

9. A non-transitory computer-readable medium containing a program that, when executed, performs an operation for displaying content using an augmented reality device, comprising:
   providing a visual scene for display, wherein the visual scene is captured from a physical environment using one or more camera devices of the augmented reality device;
   modifying the visual scene, comprising:
      removing one or more physical content elements from the visual scene;
      replacing the removed one or more physical content elements, in the visual scene, using at least one image of the physical environment previously captured using the one or more camera devices; and
      adjusting one or more of:
         physical display geometry characteristics of the visual scene based on a viewing pose of a user of the augmented reality device;
         illumination characteristics of the visual scene based on environmental illumination data; and
         display characteristics of the visual scene to improve tone mapping output;
   and
   outputting the adjusted visual scene for display on the augmented reality device.

10. The non-transitory computer-readable medium of claim 9, the operation further comprising:
    measuring one or more environmental illumination characteristics of an environment in which the augmented reality device is located; and generating the environmental illumination data based on the one or more environmental illumination characteristics.

11. The non-transitory computer-readable medium of claim 10, wherein determining one or more environmental illumination characteristics of the environment further comprises:
    applying a convolution filter to a series of captured images of the environment to determine a measurement of illumination for one or more areas of the captured images;
    determining relative movements of the augmented reality device; and
    determining one or more light sources within the environment, based on the identified areas of high-frequency illumination and the determined movement activity of the augmented reality device.

12. The non-transitory computer-readable medium of claim 9, the operation further comprising:
    determining movement activity of the augmented reality device using an accelerometer of the augmented reality device,
    wherein the physical display geometry characteristics of the visual scene are adjusted further based on the determined movement activity.

13. The non-transitory computer-readable medium of claim 9, wherein the environmental illumination data specifies at least one of a position of a light source within an environment in which the augmented reality device is located, an angle of the light source, an indication of whether the light source is omnidirectional, a color of the light source, an intensity of the light source and a reflectivity value the at least one content element in the environment.

14. The non-transitory computer-readable medium of claim 9, wherein adjusting the one or more physical display geometry characteristics of the visual scene further comprises:
    adjusting one or more active parallax barrier characteristics of the visual scene, based on the viewing pose of the user of the augmented reality device.

15. The non-transitory computer-readable medium of claim 9, wherein the viewing pose of the user of the augmented reality device is determined using one or more user-facing cameras of the augmented reality device.

16. An augmented reality device, comprising:
    a processor; and
    a memory containing a program that, when executed by the processor, performs an operation for displaying content on the augmented reality device, comprising:
        providing a visual scene for display, wherein the visual scene is captured from a physical environment using one or more camera devices of the augmented reality device;
        modifying the visual scene, comprising:
            removing one or more physical content elements from the visual scene;
            replacing the removed one or more physical content elements, in the visual scene, using at least one image of the physical environment previously captured using the one or more camera devices; and
        adjusting one or more of:
            physical display geometry characteristics of the visual scene based on a viewing pose of a user of the augmented reality device;
            illumination characteristics of the visual scene based on environmental illumination data; and
            display characteristics of the visual scene to improve tone mapping output;
        and
        outputting the adjusted visual scene for display on the augmented reality device.

17. The augmented reality device of claim 16, the operation further comprising:
    measuring one or more environmental illumination characteristics of an environment in which the augmented reality device is located; and
    generating the environmental illumination data based on the one or more environmental illumination characteristics.

18. The augmented reality device of claim 17, wherein determining one or more environmental illumination characteristics of the environment further comprises:
    applying a convolution filter to a series of captured images of the environment to determine a measurement of illumination for one or more areas of the captured images;
    determining relative movements of the augmented reality device; and
    determining one or more light sources within the environment, based on the identified areas of high-frequency illumination and the determined movement activity of the augmented reality device.

19. The augmented reality device of claim 16, the operation further comprising:
    determining movement activity of the augmented reality device using an accelerometer of the augmented reality device,
    wherein the physical display geometry characteristics of the visual scene are adjusted further based on the determined movement activity.

20. The augmented reality device of claim 16, wherein the environmental illumination data specifies at least one of a position of a light source within an environment in which the augmented reality device is located, an angle of the light source, an indication of whether the light source is omnidirectional, a color of the light source, an intensity of the light source and a reflectivity value the at least one content element in the environment.

21. The augmented reality device of claim 16, wherein adjusting the one or more physical display geometry characteristics of the visual scene further comprises:
    adjusting one or more active parallax barrier characteristics of the visual scene, based on the viewing pose of the user of the augmented reality device.

22. The augmented reality device of claim 16, wherein the viewing pose of the user of the augmented reality device is determined using one or more user-facing cameras of the augmented reality device.

* * * * *